(12) United States Patent
Kollmann et al.

(10) Patent No.: US 6,997,077 B2
(45) Date of Patent: Feb. 14, 2006

(54) METHOD FOR OBTAINING A DESIRED TOOTH FLANK BACKLASH

(75) Inventors: Wolfgang Kollmann, Pretal 197, A-8664 Veitsch (AT); Helga Kollmann, Pretal 197, A-8664 Veitsch (AT); Helmut Kratochwill, Steyr (AT); Walter Reisinger, Schwertberg (AT); Reinhard Ratzberger, Heidershofen (AT); Guenter Bachner, Steyr (AT)

(73) Assignees: Bayerische Motoren Werke AG, Munich (DE); Wolfgang Kollmann, Veitsch (AT); Helga Kollmann, Veitsch (AT)

( * ) Notice: Subject to any disclaimer, the term of this patent is extended or adjusted under 35 U.S.C. 154(b) by 0 days.

(21) Appl. No.: 10/463,567

(22) Filed: Jun. 16, 2003

(65) Prior Publication Data

US 2004/0049920 A1 Mar. 18, 2004

Related U.S. Application Data

(63) Continuation of application No. PCT/EP01/14687, filed on Dec. 13, 2001.

(30) Foreign Application Priority Data

Dec. 14, 2000 (DE) ................................ 100 62 241

(51) Int. Cl.
F16H 55/18 (2006.01)
(52) U.S. Cl. ........................................ 74/409; 29/893.1
(58) Field of Classification Search ................. 74/409, 74/440; 29/893.1, 893.2
See application file for complete search history.

(56) References Cited

U.S. PATENT DOCUMENTS

| 2,703,768 | A | * | 3/1955 | Hall | ........................... 428/336 |
| 3,548,673 | A | | 12/1970 | Suchocki | |
| 4,309,634 | A | | 1/1982 | Koroly et al. | |
| 5,196,752 | A | | 3/1993 | Palma | |
| 5,262,241 | A | * | 11/1993 | Huggins | ..................... 428/421 |
| 5,804,902 | A | | 9/1998 | Hill | |
| 2002/0146326 | A1 | * | 10/2002 | Kawaguchi et al. | ........ 417/223 |

FOREIGN PATENT DOCUMENTS

DE 650 754 9/1937

(Continued)

OTHER PUBLICATIONS

Neimann and Winter, "Maschinenelemente," vol. II, 2$^{nd}$ Edition, pp. 216-217 and 365-368.

*Primary Examiner*—William C. Joyce
(74) *Attorney, Agent, or Firm*—Blakely, Sokoloff, Taylor & Zafman; Stephen M. De Klerk

(57) ABSTRACT

A method of obtaining a desired tooth flank backlash for a transmission having at least two interlocking toothed gears, comprises applying a removable coating on at least one of the toothed gears for purposes of setting the backlash, the coating comprising a mixture containing a bonding agent and a filling material; adjusting the least two interlocking toothed gears with the coating relatively to each another essentially play-free or with only small play; and removing the coating.

13 Claims, 2 Drawing Sheets

FOREIGN PATENT DOCUMENTS

| | | |
|---|---|---|
| DE | 883 379 | 7/1953 |
| DE | 1 180 596 | 11/1959 |
| DE | 2 020 722 | 4/1970 |
| DE | 2 300 851 | 1/1973 |
| DE | 197 50 286 A1 | 11/1997 |
| JP | 56-024257 A | 3/1981 |
| JP | 03-131420 | 6/1991 |
| JP | 2001-37131 | 2/2001 |

* cited by examiner

METHOD FOR OBTAINING A DESIRED TOOTH FLANK BACKLASH

CROSS-REFERENCES TO RELATED APPLICATIONS

This application is a Continuation Application of International Application No. PCT/EP01/14687, filed on Dec. 13, 2001 (WO 02/48575), which claims priority from German Patent Application No. 100 62 241.0, filed on Dec. 14, 2000.

FIELD OF THE INVENTION

The invention relates to a method of obtaining a desired tooth flank backlash for a gear transmission.

BACKGROUND OF THE INVENTION

The tooth profile interlocking clearance, and in particular the torsional backlash, is known to create a hydrodynamic lubrication, compensating for dimensional changes caused by temperature effects, preventing abrasion or premature wear of the shaft, axles and toothed gears, and compensating bad construction and assembly work.

In the serial production of engines, gears or other aggregates, the adjustment of the tooth backlash of two or more toothed gears in mesh (serrated, helical, or other) pressed, screwed or secured otherwise onto driven or secondary shafts, requires elaborate alignment equipment or alignment devices.

DE 1 180 596 B, for example, describes a transmission with a device for adjusting the tooth flank backlash, axially displacing the conical toothed gears against one another depending on certain parameters of the gear transmission, thus adjusting the tooth backlash depending on the rotational frequency, temperature or stress.

DE-OS 2 020 722 provides for a wedge-shaped design of the teeth of toothed spur pinion gears allowing for an adjustment of the tooth flank backlash by axially displacing a toothed gear.

A common suggestion for adjusting the tooth flank backlash is known, e.g. from DE-PS 650 754, whereby one of the shafts of the interlocking toothed gears is stored in an adjustable eccentric bush, which is fastened relatively to the enclosure when trying to obtain the desired flank backlash.

DE 197 50 286 A1 also provides for eccentric elements in gear transmissions for compensating shafts of internal combustion engines. This provides for a movable and securable tooth flank backlash adjustment of the storage frame by means of the eccentric elements relatively to the rest of the machine enclosure the adjustment of the tooth flank backlash between a first gear located on the crankshaft-side and an intermediate or second gear located in a frame of the compensating bearings and interlocked with a driving gear of the compensating shafts. This assembly allows to adjust the tooth flank backlash between no more than two toothed gears.

DE-PS 883 379 describes a toothed rack-toothed quadrant gear transmission comprising a tooth flank-like clearance in at least one tooth flank in one of the final positions in order to avoid tooth flank backlash.

Furthermore, Niemann and Winter, "Maschinenelemente (Machine Elements)," volume II, $2^{nd}$ edition, p. 365, states that the flank backlash can be reduced to almost zero by copper plating the teeth of a toothed gear.

It is known from JP 560 24 257 that the backlash between toothed gears of a decimal gear pump can be set by applying a coat which is removed during operation.

SUMMARY OF THE INVENTION

A first aspect is directed to a method of obtaining a desired tooth flank backlash for a transmission comprising at least two interlocking toothed gears. According to the first aspect, the method comprises applying a removable coating on at least one of the toothed gears for purposes of setting the backlash, the coating comprising a mixture containing a bonding agent and a filling material; adjusting the least two interlocking toothed gears with the coating relatively to each another essentially play-free or with only small play; and removing the coating.

According to another aspect, a method is provided of obtaining a desired tooth flank backlash for a transmission comprising at least two interlocking toothed gears. The method comprises using, for at least one of the gears, a gear with a removable coating for purposes of setting the backlash, the coating comprising a mixture containing a bonding agent and a filling material; adjusting the least two interlocking toothed gears with the coating relatively to each another essentially play-free or with only small play; and removing the coating.

DESCRIPTION OF THE DRAWINGS

Embodiments of the invention will now be described, by way of example, and with reference to the accompanying drawings, in which.

DESCRIPTION OF THE PREFERRED EMBODIMENTS

Figure 1:
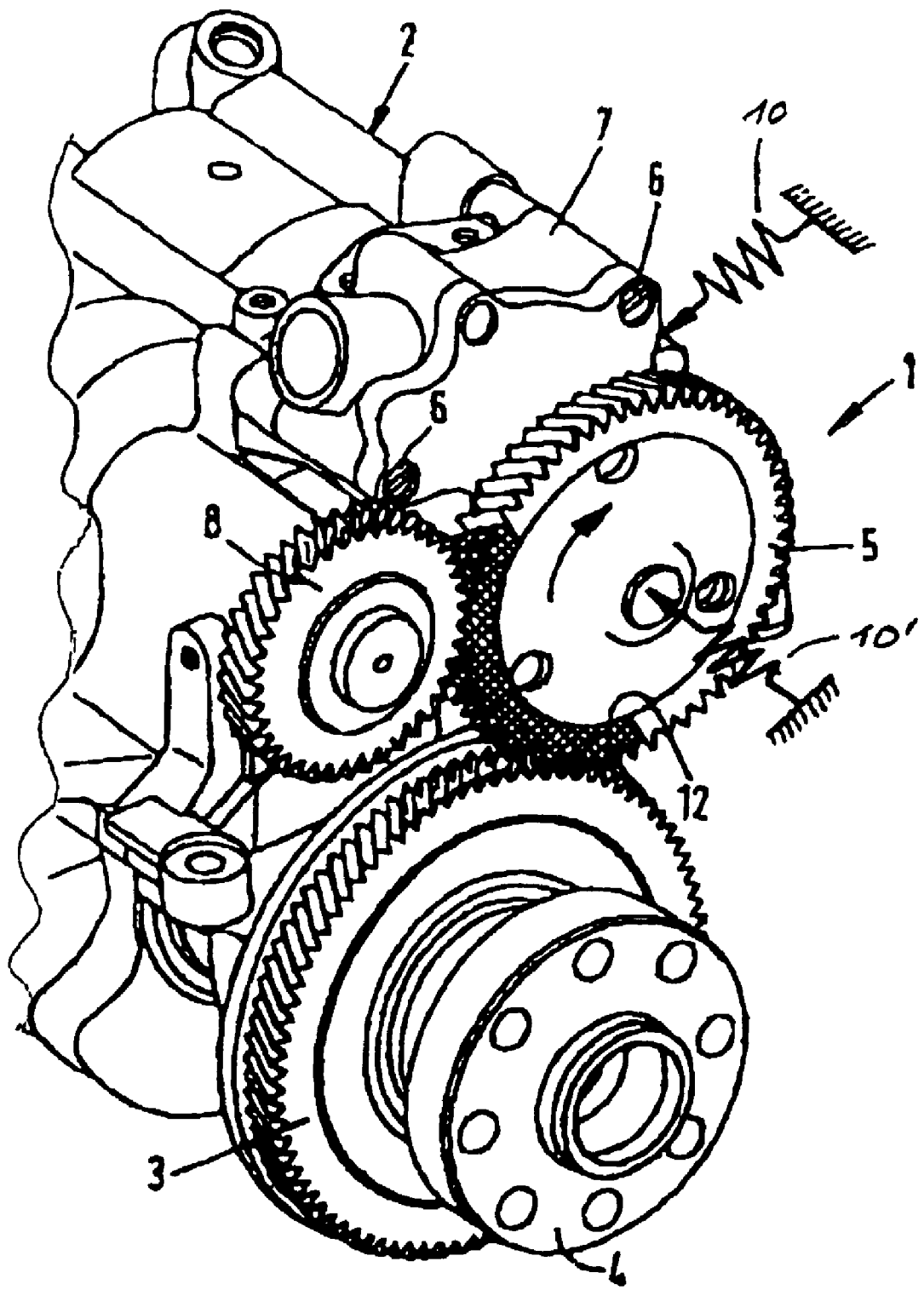
FIG. 1 shows a gear for compensating shafts of an internal combustion engine whereby a toothed gear is coated with a mixture of polymeric material and $MoSO_2$.

FIG. 1 illustrates an exemplary gear. Before proceeding further with the detailed description of FIG. 1, however, a few items of the embodiments will be discussed.

The embodiments provide a relatively simple, economical and fast method to obtain a desired tooth flank backlash for a gear transmission.

For this, the embodiments describe a method to obtain a desired tooth flank backlash for a gear transmission with at least two combing toothed gears. Both toothed gears are set relatively to one another by means of a removable coating on at least one toothed gear allowing to adjust the backlash. The coating is composed of a mixture containing a bonding agent and a filler. For the purpose of clarification, it needs to be mentioned that "bonding agent" does not refer to a solvent, which is merely used to apply the filling and evaporates or is evaporated after being applied.

This method thus applies, for example, a coating made of a mixture of a bonding agent and a (e.g., granular or particle-like) filler on the entire toothed gear or a toothed gear segment, whereby the thickness of the layer is determined by the backlash to be obtained. The bonding agent produces a coherent coat. The coating binds or hardens, and thus advantageously resists the pressure when aligning the backlash-free grip of the toothed gears resulting from the coating and the subsequent fixation of the interlocking gears.

This is caused in the first place by the assimilated filling, which mainly makes the coating incompressible.

Once the backlash has been set, the applied coating can be advantageously and easily removed, e.g. mechanically or by peeling off with a solvent.

However, it is preferred to remove the coating by letting it rub off during running. Such an automatic removal is mainly caused by the presence of the filling, which secures, e.g. during a test run of the gear transmission, the necessary removal of the coating in the smallest particles and within the shortest period of time, preferably within three minutes. The removal in small particles can be important when the gear lubricant oil circulation and a motor oil circulation are not separated from one another. The preferred coating is compatible with motor or gear lubricant oil, i.e., the coating is not removed when it comes in contact with the oil, but rather only when the transmission gear is in operation. This way, the required tooth flank backlash is obtained in a very simple way.

The bonding agent can be inorganic or organic. It preferably contains a polymeric material. The filler could be a common filler such as carbonates and silicates. The filler preferably contains one or a plurality of solid lubricants.

The coating can be applied in a conventional way like a coating material or paint, or as a solvent-free electrostatic coating (powder coating), for example. If the bonding agent is a polymeric material, the preferred method of application consists of dissolving the polymeric material in a solvent, suspending the filling, in particular solid filling, in the solution, and applying this solvent containing mixture by dipping, centrifugal casting, or aerosol mist technology. Next, the solvent is evaporated with or without heat. If necessary, the applied mixture of polymeric materials and filler, in particular solid filler, is hardened. Depending on the polymeric material, this is done by heating or exposure to UV or electron beams. The aerosol mist application of the solvent-containing mixture is especially preferred, since it allows for the most uniform application.

Suitable polymeric materials are, in principle, any artificial resins which can be applied together with a filler, in particular a solid filler, on the toothed gear with the methods described above. Examples are phenolic resins, amino resins, glycerophthalic resins, polyvinyl acetal, epoxy resin, polyurethane resin, polyester resin, chlorinated polypropylene resin, ketone resine, acrylic resin, styrene-butadiene-copolymers, polyamide, polyimide, polyesterimide, polyetherimide and polyamidimide or compounds thereof.

Polyamidimide is especially preferred. Polyamidimide is applied on the toothed gear in its poly(carbamolycarboxylic acid) pre-stage as a solution with a well-adjustable viscosity, together with the filler, in particular a solid filler. The mixture is subsequently released from the solvent at a temperature of 180 to 240° C. and hardened into the polyamidimid. The lower the heating temperature, the less complete the hardening, which allows the coating to be removed more easily during a test run of the gear. A temperature of approx. 220° C. for about 60 minutes results in a particularly good coating capacity. The hardened polyamidimide and the filling, in particular a solid filling, ensure an excellent incompressibility and are yet easily removed from the toothed gears during a test run of the gear, it is compatible with motor oil and does not dissolve when it gets in contact with it.

In case of a solid filler, any known solid lubricants can be used, as long as they are capable of giving the polymeric material enough incompressibility. These are, in particular, inorganic solid lubricants such as graphite, $MoS_2$, boron trioxide, lead monoxide, basic lead carbonate, red lead oxide, and glass. Graphite and $MoS_2$ are preferred, and in particular $MoS_2$ is especially preferred since it is highly engine-compatible.

The particle size of the used solid lubricants depends on the preferred thickness of the coat. When $MoS_2$ is used as a solid lubricant, it usually lies in a range of approximately 1 to 60 micrometer, preferably 1 to 10 micrometer and in particular 3 to 5 micrometer. If, for example, small (<5 micrometer) $MoS_2$ particles are used, e.g. for a thickness of more than 20 micrometer, multiple layers of coating could be required, depending on the bonding agent, since otherwise, the applied mixture could "run out" and result in an uneven application. For this purpose, a drying pause should be introduced between the different applications, possibly by heating at moderate temperatures, e.g. below 120° C. for polyamidimide bonding agents. A very homogenous application with a final coat thickness of 45 to 60 micrometer after hardening is preferably obtained with a double application of a mixture composed of bonding agents and $MoS_2$ with a particle size of 3 to 5 micrometer. Large particle sizes up to 60 micrometer require one coat of mixture to obtain a uniform coating, e.g. with the same thickness as mentioned above.

The filling content, in particular the solid lubricant in the hardened coat, generally lies around 20 to 40 percentage by weight relative to the total weight of the coating, and preferably around 23 to 33 percentage by weight.

As mentioned above, the polymeric material is preferable applied as a solution also containing the suspended filler, in particular solid lubricant. The type and quantity of solvent depends on the specific polymeric material. The quantity generally lies in the range of 10 to 35 percentage by weight, relative to the total weight of the mixture to be applied, allowing for the preferred viscosity of the solution.

In a concrete case, the mixture to be applied can comprise about 50 to 65 percentage by weight of polyamidimide resin, about 20 to 25 percentage by weight of $MoS_2$, and about 13 to 30 percentage by weight of a solvent. In this concrete case, the solvent comprises a mixture of solvents, composed of about 1.25 to 2.5 percentage by weight of 2-methyl-2-pentanol-4-one, 5 to 12.5 percentage by weight of xylene, 2 to 5 percentage by weight of toluene and 5 to 10 percentage by weight of N-methyl pyrrolidone, all relative to the total weight of the mixture to be applied.

The coating is applied completely evenly from the root to the tip of the tooth and from the front to the back of the tooth. The entire tooth rim can also be coated. It is preferred, however, to only coat a segment of the tooth rim, for example a segment of approx. 140° C. This makes it easy to verify whether the coating will present the preferred thickness after drying and possibly hardening. The gear teeth are fastened in a position in which the coated part(s) of the coated toothed gear(s) are in mesh; subsequently, the coated part(s) of the coated toothed gear(s) are turned out of mesh and the backlash between the coated toothed gear(s) and possibly the uncoated toothed gear(s) is measured with a gauge.

The thickness of the dried and possibly hardened coating depends on the preferred tooth flank backlash. When used as compensating shafts for internal combustion engines, the thickness of the coating can lie around 10 to 60 micrometer for a total circumferential backlash of 20 to 120 micrometer when coating both sides of a toothed gear, or opposing sides of a tooth space, for example. The toothed gear to be coated are preferably subjected to phosphatization with a common phosphatizing agent in order to avoid that the polymeric materials/solid lubricant coating separate in the form of plates.

Returning now to FIG. 1, a gear 1 for a compensating shaft apparatus 2 of a not further specified internal combustion engine comprises a first toothed gear 3 on a crankshaft 4 of the internal combustion engine and rotating around an axle with a fixed enclosure. The toothed gear 3 of the crankshaft meshes a second toothed gear 5 intended to run a lock-type pump 7 with a limited movement during assembly, and which can be subsequently locked with studs 6. The second toothed gear 5 also serves as an intermediate gear for a third toothed gear 8 driving the compensating shafts (not shown) in the compensating shaft apparatus 2.

The tooth flank play between the three interlocking toothed gears 3, 5 and 8 are set with a coating 12 applied on a partial segment of the toothed gear 5. This coating 12 is arranged on the second toothed gear 5, which can be adjusted for the first and the third toothed gear 3, 8 with a set force following a spring tension 10 working on an arranged pump 7, and is arranged play-free between corresponding tooth flanks of the toothed gears 3, 5, 8.

The coating 12 sticking to the toothed gear presents a material thickness of 10 micrometer—60 micrometer for a total circumferential backlash of 20 micrometer—120 micrometer on either flank of a tooth. These degrees of thickness particularly apply to the mesh points shown on the partial circle of the toothed gear 5, whereby this thickness has been obtained with the spring tension of a power apparatus attached to the side of the slightly loosened pump 7.

In order to increase the adjustment precision, a slant-toothed spur gear 1 is additionally equipped with an axial power component 10, acting on the pump 7 which has not yet been loosened.

In order to obtain zero tooth flank play for a coating 12 in mesh, the toothed gears 3, 5, 8 may be insignificantly rotated back and forth. In order to verify the thickness of the coat, the pump 7 is fastened with the studs 6 and the coated 12-toothed gear segment is twisted out of the interlocking area, upon which the tooth flank backlash is measured with a gauge.

Figure 2A:
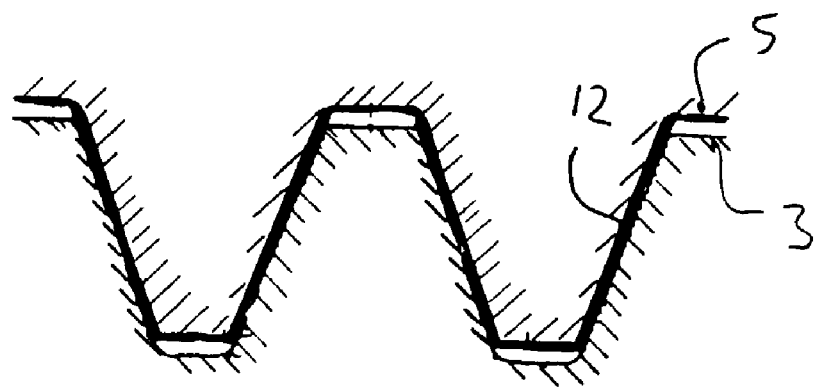
FIG. 2 illustrates a diagrammatic view of a section of two meshing and aligned tooth gears shown earlier, with (FIG. 2a) and without coating (FIG. 2b).

FIG. 2a presents a diagrammatic view of a section of two meshed and aligned tooth gears 3 and 5. One of the toothed gears, i.e., toothed gear 5, shown earlier, has a coating 12 (presented here in an exaggerated way). The adjustment is done without play or with a smaller play than the desired backlash. In the preferred case of an adjustment without play, the thickness of the coating 12 corresponds with the backlash in the final position (after removing the coating 12). The area of the tooth tips presents a gap since it requires a bigger backlash than the thickness of the coating (so-called tooth tip backlash).

Figure 2B:
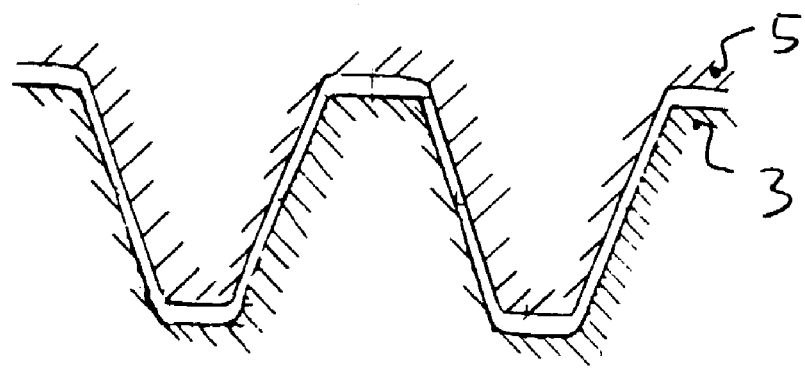

The coating 12 is automatically removed during a test run of the transmission apparatus, thus resulting in the preferred tooth flank backlash shown in FIG. 2b (presented here in an exaggerated way for the purpose of illustration).

EXAMPLE

Manufacturing of a Toothed Gear Coating

A polyamidine-pre-stage (Pyralin®, available at DuPont Deutschland GmbH[1]) (50 grams) in a solution of 2.5 g of 2-methyl-2-pentanol-4-one and 10 g of xylene was diluted and mixed with 2.5 g of toluene and 10 g of N-methyl pyrrolidone. Subsequently, 25 g of $MoS_2$ particles with an average particle size of 3–5 µm were added and thoroughly dispersed in the solution with a dispersing apparatus. The obtained suspension was transferred in a spray gun.

[1] DuPont Germany LLP

A phosphatized toothed gear of a transmission was sprayed in one segment at a distance of 20 cm and subsequently dried for 50 minutes at a temperature of 100° C. Then, a second spraying under the conditions mentioned above took place.

The coating was then dried and hardened for 70 minutes at 190°. The coating thickness after drying and hardening was 55 micrometer. Once the movable toothed gear was fastened, the coating separated from the toothed gear in the shape of tiny particles after a three-minute test run of the transmission.

All publications and existing systems mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method of obtaining a desired tooth flank backlash for a transmission comprising at least two interlocking toothed gears, comprising:
    applying a removable coating on at least one of the toothed gears for purposes of setting the backlash, the coating comprising a mixture containing a bonding agent that contains a polymeric material and a filling material that contains a solid lubricant wherein, during application, the mixture presents 50 to 65 percentage by weight of polyamidimide resin, 20 to 25 percentage by weight of $MoS_2$, and 13 to 30 percentage by weight of solvent, relative to the total weight of the mixture;
    adjusting the least two interlocking toothed gears with the coating relatively to each another essentially play-free or with only small play; and
    removing the coating.

2. The method of claim 1, wherein the removal of the coating is obtained by abrasion of the coating caused by a run of the transmission.

3. The method of claim 1, wherein the mixture is applied in form of a solution of the polymeric material, in which a filling material has been suspended, and subsequently separated by evaporating or heating the solvent.

4. The method of claim 3, wherein the mixture is sprayed on.

5. The method of claim 1, wherein the solid lubricant comprises the solid lubricant $MoS_2$ with a particle size ranging from 1 to 60 micrometer.

6. The method of claim 1, wherein the applied mixture is hardened after the application.

7. The method of claim 6, wherein the applied mixture is hardened at a temperature between 90° C. and 240° C.

8. The method of claim 6, wherein the applied mixture is hardened at a temperature between 18° C. and 240° C.

9. The method of claim 1, wherein the mixture is applied to a segment of the toothed gear.

10. The method of claim 1, wherein the mixture is applied to both flanks of a tooth or on opposing flanks of a tooth gap, with a thickness after bonding or hardening of 10 to 60 micrometer for a total circumferential backlash of 20 to 120 micrometer.

11. The method of claim 1, wherein that parts of the toothed gear on which the mixture is applied, have been subjected to phosphatization.

12. The method of claim 1, wherein both toothed gears are pressed against one another with a pre-determined force in order to obtain a play-free alignment.

13. A method of obtaining a desired tooth flank backlash for a transmission comprising at least two interlocking toothed gears, comprising:

using, for at least one of the gears, a gear with a removable coating for purposes of setting the backlash, the coating comprising a mixture containing a bonding agent that contains a polymeric material and a filling material that contains a solid lubricant wherein, during application, the mixture presents 50 to 65 percentage by weight of polyamidimide resin, 20 to 25 percentage by weight of $MoS_2$, and 13 to 30 percentage by weight of solvent, relative to the total weight of the mixture;

adjusting the least two interlocking toothed gears with the coating relatively to each another essentially play-free or with only small play; and removing the coating.

* * * * *